(12) United States Patent
Hundscheidt et al.

(10) Patent No.: US 6,691,164 B1
(45) Date of Patent: Feb. 10, 2004

(54) VERSATILE SYSTEM FOR FUNCTIONAL DISTRIBUTION OF LOCATION REGISTERS

(75) Inventors: Frank Hundscheidt, Kerkrade (NL); Heino Hameleers, Kerkrade (NL); Eric Valentine, Plano, TX (US); Lee Davidson, McKinney, TX (US)

(73) Assignee: Ericsson Inc., Plano, TX (US)

( * ) Notice: Subject to any disclaimer, the term of this patent is extended or adjusted under 35 U.S.C. 154(b) by 0 days.

(21) Appl. No.: 09/548,321

(22) Filed: Apr. 13, 2000

(51) Int. Cl.[7] ............................................. G06F 15/173
(52) U.S. Cl. ...................................... 709/225; 709/226
(58) Field of Search ................................ 709/225, 226, 709/229, 203; 370/352, 353; 455/936

(56) References Cited

U.S. PATENT DOCUMENTS

| | | | |
|---|---|---|---|
| 5,577,103 A | | 11/1996 | Foti .............................. 379/59 |
| 6,144,857 A | * | 11/2000 | Price et al. .................. 455/445 |
| 6,226,523 B1 | * | 5/2001 | Karlsson et al. ............ 455/466 |
| 6,292,657 B1 | * | 9/2001 | Laursen et al. ............. 455/411 |
| 6,308,267 B1 | * | 10/2001 | Gremmelmaier ............ 713/168 |
| 6,359,880 B1 | * | 3/2002 | Curry et al. ................. 370/352 |
| 6,370,515 B1 | * | 4/2002 | Diamond et al. ............. 705/28 |
| 6,393,421 B1 | * | 5/2002 | Paglin .......................... 707/9 |
| 6,490,451 B1 | * | 12/2002 | Denman et al. ............. 455/436 |

FOREIGN PATENT DOCUMENTS

WO  99 33293 A  7/1999

OTHER PUBLICATIONS

International Search Report for PCT/US01/11844, dated Sep. 10, 2001.

* cited by examiner

*Primary Examiner*—Mehmet B. Geckil

(57) ABSTRACT

A versatile network architecture (100) utilizing functional distribution of location registers to provide subscriber roaming without requiring local profile copies is disclosed; comprising a core network (102) having a mobility server (110) communicatively interfaced (114) with one or more external networks (106) and a profile server (108) storing subscriber records and communicatively interfaced (112) with one or more external networks (106), an access network (104) having a plurality of access service infrastructures (116) communicatively interfaced (122) with the mobility server and each providing communication access within a particular area, and one or more subscriber units (118) communicatively interfaced (124) with the profile server and operating within one of the particular areas.

14 Claims, 2 Drawing Sheets

US 6,691,164 B1

VERSATILE SYSTEM FOR FUNCTIONAL DISTRIBUTION OF LOCATION REGISTERS

TECHNICAL FIELD OF THE INVENTION

The present invention relates generally to mobile communications networks and, in particular, to a network architecture utilizing functional distribution of location registers to provide uniform subscriber handling independent of access technology.

BACKGROUND

Conventionally, a mobile communications system usually comprises a central operations facility, having a home location register (HLR), and a plurality of local coverage areas. All data associated with a particular subscriber unit (e.g. mobile phone number, rate plan) is stored as a subscriber profile record in the HLR. Each local coverage area typically comprises a mobile switching center (MSC) and a visitor location register (VLR. As a subscriber unit roams into a given MSC service area, a temporary copy of that subscriber's profile record is downloaded to the VLR in the local switching center handling call traffic for the area. The local copy typically expires once a subscriber unit leaves the given MSC service area. The HLR tracks the location of each subscriber unit in the system; and each time a new MSC is utilized, the HLR receives a location update.

As such, conventional mobile networks and topologies present a number of problems and challenges to system designers and users. Since the subscriber records in the VLR are local copies of the subscriber records in the HLR, conventional mobile architectures need mechanisms to keep all multiple copies of the data consistent (e.g. an update of the VLR in case data is modified in the HLR). Furthermore, the HLR very often becomes a bottleneck in case of a restart/reload of either the MSC/VLR or the HLR. This is due to the numerous location updatings, where the HLR provides copies of the subscriber profiles to the VLRs, occurring upon restart/reload.

Recently, some communications systems have decoupled control signaling and user payload. Conventional systems generally have backbone networks independent of access networks. The backbone networks, which typically include service profiles and mobility management servers, should be rather transparent to the access technology used at the moment. The service profiles should still consider the specifics of the access technology (e.g. low bandwidth characteristics in case of a mobile access), but the profile should generally remain the same, and only parameters in the profile should be adapted. Currently, conventional mobility management parts (typically located in the HLR) are not able to cope with different access technologies.

Other problems and challenges are also presented by conventional mobile networks and topologies. Conventional VLR and HLR structures handle both subscriber services and mobility, thus these nodes are characteristically rather complex, and hardly scalable. Integration with global mobility mechanisms (e.g. Mobile IP) is further complicated due to the combined nature of the HLR and VLR structures. Replication or distribution the HLR/VLR structures is very difficult if not functionally impossible, since these are mixed nodes (mobility management and subscriber profiles) of tightly coupled functional areas. Further, complicated procedures are required to provide inter-working between the HLR and VLR and other subscriber profiles, such as a subscriber profile in an H.323 or SIP (Session Initiation Protocol) type of network.

Previously, local copies of the HLR profiles (i.e. the VLRs) were distributed all over the networks in case of roaming. Data was kept consistent via mechanisms like location updating, mobile subscriber purging, etc. Because the achievable transmission speeds in conventional networks were relatively slow, this distributed caching of the subscriber profiles was seen as the only feasible option. One major shortcoming of such approaches was that each network had its own profile and mobility management databases. Inter-working between subscriber profiles in different networks was either not considered, not possible, or not feasible given system performance and constraints. For example, conventional systems ordinarily would not be able to determine which service profile should have priority where several profiles apply for a specific traffic case. Such situations, if encountered at all, were commonly addressed on a case by case basis.

SUMMARY OF THE INVENTION

Therefore, versatile architecture for mobile networking that fully utilizes performance and throughput of advancing communications technology in a simple and cost-effective manner while eliminating the need for special mechanisms to keep data consistent across the network in case of restarts and profile modifications is now needed, providing robust and efficient profile inter-working and prioritization while overcoming the aforementioned limitations of conventional methods.

The present invention provides for network architectures with roaming functionality, but without requiring local copies of subscriber records. The present invention provides profile and mobility registers or servers, reconfiguring and optimizing operations previously accomplished by HLR/VLR structures. The present invention decouples user access technology and methods from the type of subscription service that user has; simplifying operation and providing scalability in new profile and mobility handling.

DETAILED DESCRIPTION

The present invention defines a system, comprising various structures and methods, implementing a mobile communications network utilizing functional distribution of location registers to provide subscriber roaming without requiring local profile copies. The present invention fully utilizes performance and throughput of advancing communications technology simply and cost-effectively while eliminating the need for special mechanisms for network data refresh in case of restarts and profile modifications. The present invention provides robust and efficient profile inter-working and prioritization within a given mobile communications network or system.

It should be understood that the principles and applications disclosed herein can be applied to a wide range of mobile communications systems utilizing a variety of network standards and access technologies. For purposes of explanation and illustration, the present invention is hereafter described in reference to one embodiment of a wireless telecommunications system. The present invention, however, is equally applicable in any type (e.g. packet-switched protocol based) of mobile network (e.g. traditional GSM, IP based GSM, UMTS, Wireless LAN, or DECT).

With recent and continuous improvements in mobile communication technology, achievable transmission speeds have correspondingly increased. Additionally, demands on mobile communication systems are steadily increasing as many megabytes of data are transmitted and downloaded by clients upon request. These and other factors signal the opportunity and demand for network architectures where no local copies of subscriber records (VLR cache) are needed in order to support roaming functionality.

Recognizing this, the present invention provides for network architectures with roaming functionality, but without requiring local copies of subscriber records. The present invention provides profile and mobility registers (hereafter referred to as servers), reconfiguring and optimizing operations previously accomplished by HLR/VLR structures. The present invention provides for the logical separation of mobility and subscriber handling; allowing for uniform subscriber handling across a number of disparate access networks.

Figure 1:
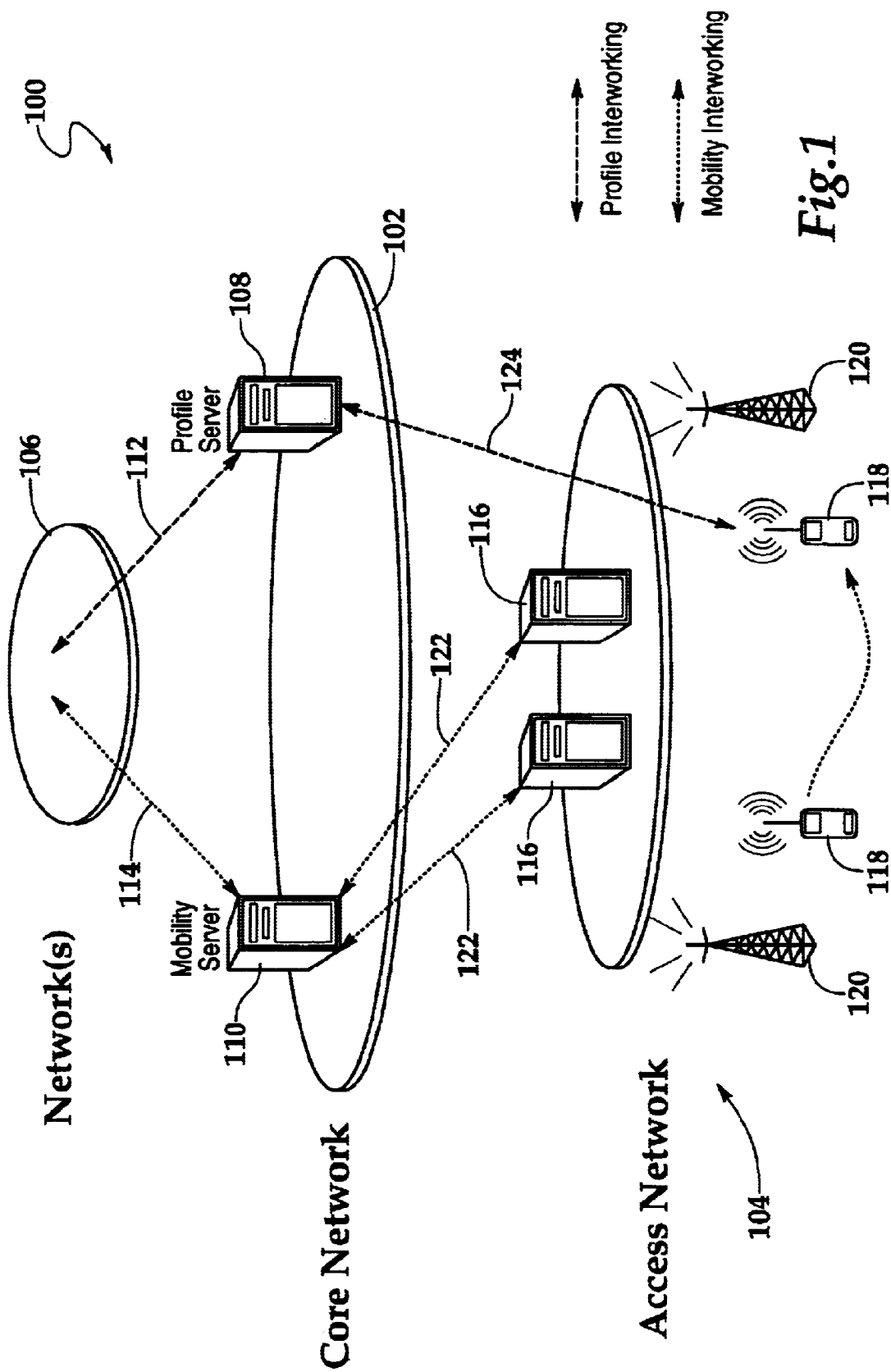
FIG. 1 is an illustrative diagram of a wireless telecommunications system according to the present invention.

The present invention is now described in reference to FIG. 1, which illustrates a mobile network architecture 100 according to the present invention. Architecture 100 comprises a core network 102 and an access network 104. Elements of architecture 100 may interface with one or more external networks 106 (e.g. the Internet for packet-switched protocol operations or a public switched telephone network). Core network 102 comprises a profile server 108 communicatively linked with a mobility server 110, via an appropriate protocol, such as MAP or FTP. Alternatively, profile server 108 may communicate with mobility server 110 via an intermediary device, such as an HLR, within or outside network 102, using an appropriate protocol (e.g. MAP). Profile server 108 may have a profile inter-working interface 112 with one or more external networks 106; just as mobility server may have a mobility inter-working interface 114 with one or more external networks 106. Interface between mobility server 110 and profile server 108 may be provided such that the profile server may check a current roaming area for a specific subscriber (e.g. only the type of network in order to set the network specific parameters) or such that the mobility server may check whether the subscriber is allowed to roam in a certain network.

Access network 104 comprises one or more service infrastructures 116, such as a base station controller or a radio network controller, usually located in a particular access area, which interface with core network 102 to provide services to mobile subscriber units 118 via base stations 120. Mobility server 110 has a mobility inter-working interface 122 with each of the one or more service infrastructures 116. Interface 122 is a structure for managing control signal traffic between mobility server 110 and infrastructure(s) 116, such as a call control server or layer, and may reside in either the core network 102 or the access network 104. Generally, mobility server 110 will have one interface 122 for each access network 104 that it couples to. Interface 122 may thus be utilized to translate between a generic control structure for server 110 and the specific control structure for any given access network 104. Profile server 108 may have a profile inter-working interface 124 with one or more of the mobile subscriber units 118. Interface 124 is a structure for managing control signal traffic between profile server 108 and unit(s) 118, similar to interface 122.

In architecture 100, both the mobility server 110 and profile server 108 reside in the core network 102. Depending on required or desired communications technologies, or more mobility servers 110 (one for each type of access network 104, for example) may be utilized within core network 102 with a single profile server 108. Alternatively, a single mobility server 110 may be utilized for multiple access networks 104. The mobility server 110 interfaces with the access network 104 regarding mobility and call control handling, such as location updating and handover. The profile server 108 interfaces with the subscriber units 118 and various call control nodes(such as base station 120), performing operations such as subscription checks and subscriber data management. Optionally, multiple instances of mobility server 110, or of profile server 108, may be utilized to provide for complex routing or for redundancy in case of system failures.

During operation of architecture 100, mobility server 110 administers the roaming of subscriber unit 118 within the different access networks 104 served. Mobility server 110 may provide an inter-working interface between different service infrastructures 116, such as GTP (GPRS tunneling protocol), Mobile Application Part mobility in GSM, or Mobile IP via the Internet. Furthermore, mobility server 110 may provide a standard interface (e.g. Mobile IP Agents), allowing for a global mobility concept. Other interfaces such as GPS (Global Positioning Service) may be provided as well. Application Programming Interfaces (APIs) may be provided by mobility server 110, allowing for location based or mobility related services, such as handover charging, location based charging, and location based services.

Profile server 108 handles subscriber profiles, including access technology specific parameters. Furthermore, profile server 108 may be adapted to a global standard interface, providing simple and efficient profile inter-working and prioritization with multiple external networks 106. The standard interface may be an application layer protocol capable of running over various transmission layers, including IP (Internet protocol) and N7 networks. It has a query/response structure with multiple keys in the query direction that are based on subscriber identity (e.g. telephone number or IP address), and profile fields in the response direction including information (such as service descriptions or billing data) in an access technology specific format. For example, extension container features within MAP messaging might be modified to provide a standard profile interface. Further, APIs may be provided to allow for subscriber directed data management (e.g. update of subscriber profile via the Internet).

Figure 2:
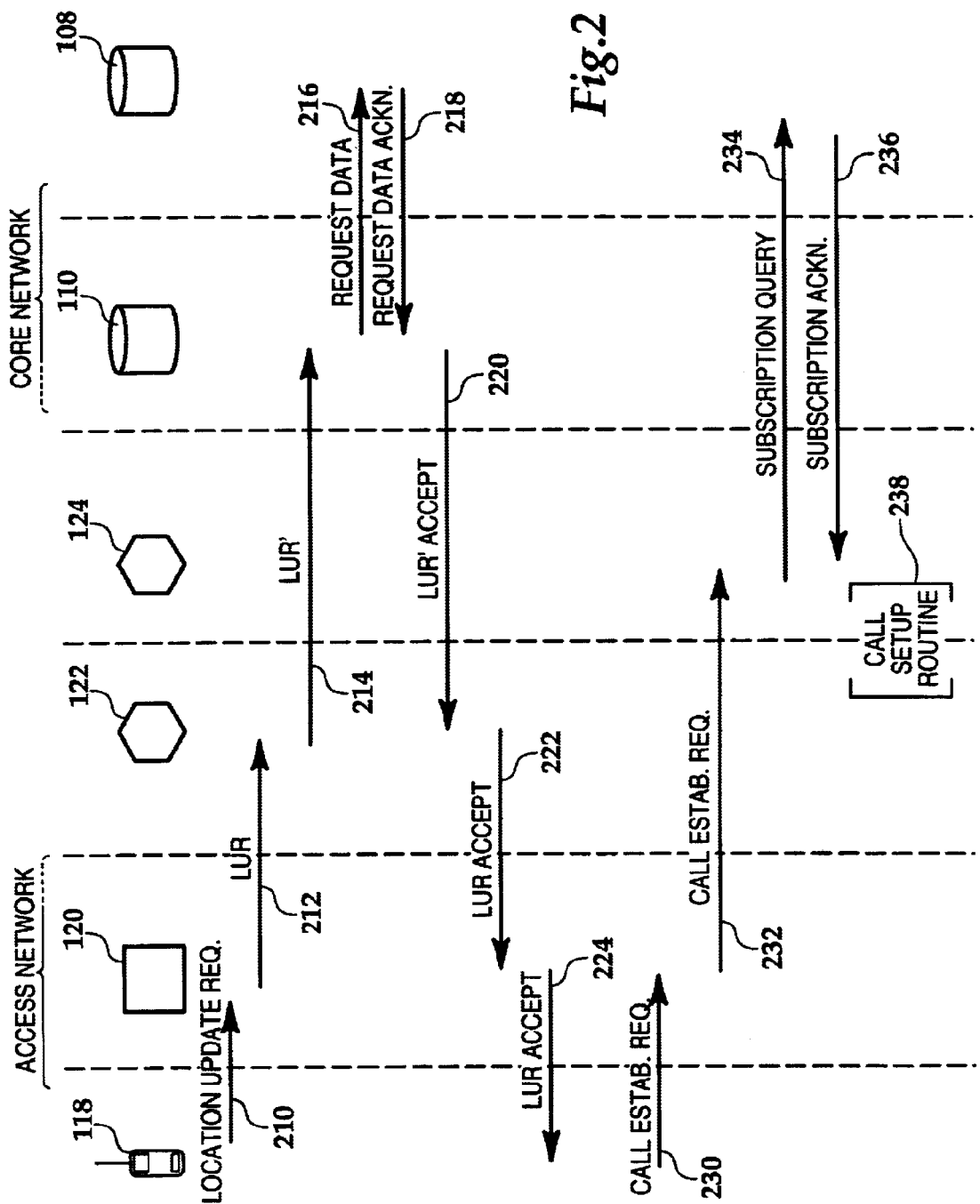
FIG. 2 is an illustrative diagram depicting exemplary operation of the system of FIG. 1.

The operation of architecture 100 is further illustrated in reference now to FIG. 2, which depicts some operational interactions between members of architecture 100. FIG. 2 depicts subscriber unit 118, station 120, mobility interface 122, profile interface 124, mobility server 110, and profile server 108. During mobile operation, unit 118 may desire or require update and transmit a corresponding message, such as a location update request(LUR) 210, to station 120. The LUR is transmitted 212 to interface 122. Interface 122 transmits 214 a specialized form (LUR') of the request to mobility server 110. As depicted, the interface 122 to the mobility server is generic; allowing for communication with a variety of access networks. Alternatively, interface 122 and mobility server 110 may be access network specific. Mobility server sends a request data message 216 to profile server 108 to identify unit 118. Profile server 108 will acknowledge the request data message 218. Approval decision may be made based on a number of desired factors, such as subscription data, geographic location, network loading. Assuming the update is approved, mobility server 110 will then generate an LUR' accept message 220, which will be converted by interface 122 into an LUR accept 222 and forwarded 224 to unit 118. Another exemplary communication might involve unit 118 attempting to establish a call. Unit 118 forwards a call establish request 230 to station 120. Station 120 forwards 232 the request to profile interface 124. Profile interface transmits a subscription query message 234 to profile server 108 to check the user's authorization. If authorized, profile server 108 sends a subscription acknowledge message 236 back to interface 122, and a typical call setup routine 238 is initiated. Mobility server 110 is not utilized prior to call setup, as profile server 108 handles all user subscription data independent of mobility and access function.

The present invention thus provides inter-working between subscriber profiles in different networks. Since the profile and mobility servers are independent to a certain degree(i.e. a one to one correspondence is not necessary), and their importance may differ, the number of corresponding nodes (and redundancy) may be handled and/or allocated on a per node type basis. The mobility and profile servers are thus simpler and more efficient than the conventional HLR and VLR mechanisms.

The present invention thus provides a network architecture utilizing a functional distribution of registers; simplifying mobile network operation and providing scalability with new profile and mobility handling, such as providing the ability to decouple user access technology and methods from the type of subscription service that user has. Thus, a user accessing a cellular network may be approved for, and provided, access via a subscription profile with a cable or Internet service provider.

Furthermore, due to the fact that there are no more local copies of the different profiles, there is no need for a special mechanism to keep the data consistent in case of restarts and profile modifications (such as sending all the subscriber data from the HLR to the VLR in case of a restart/reload in the MSC/VLR). A clear interface between the mobility server and the profile server may be provided such that the profile server may check the current roaming area for a specific subscriber (e.g. only the type of network in order to set the network specific parameters) or such that the mobility server may check whether the subscriber is allowed to roam in a certain network.

What is claimed is:

1. A mobile communications architecture comprising:
    an access network providing a subscriber with communication access within a particular area;
    a core network, storing a profile for the subscriber and administering the subscriber's communication access within the access network, communicatively interfaced with the access network, with the subscriber, and with networks external to the architecture; and
    wherein said core network further comprises
        a mobility server, communicatively Interfaced with the access network, storing location information associated with said subscriber and administering the subscriber's communication access within the access network; and
        a profile server, communicatively linked with the mobility server, storing the subscriber profile associated with said subscriber and wherein said profile server does not store any location information associated with said subscriber and administered by said mobility server.

2. The architecture of claim 1 wherein the access network further comprises a plurality of service infrastructures, each communicatively interfaced with the mobility server and providing communication access within a particular area.

3. The architecture of claim 2 wherein the access network further comprises a plurality of subscriber units, each communicatively interfaced with and having a profile stored at the profile server, operating within one of the particular areas.

4. The architecture of claim 3 wherein the mobility and profile servers each communicatively interface with one or more networks external to the architecture.

5. The architecture of claim 4 wherein the mobile communications architecture is a mobile telecommunications system.

6. The architecture of claim 5 wherein the service infrastructures are mobile switching centers.

7. The architecture of claim 3 wherein the service infrastructures are based on different protocols.

8. A method of providing a mobile communications system without periodic replication of subscriber data wherein said mobile communications system includes a plurality of access networks and a core network, comprising the steps of:
    providing a single profile server within said core network for storing and administrating the subscriber data wherein said profile server is independent of said access networks;
    providing one or more mobility servers within said core network for administrating network operations, each communicatively linked with the profile server and independent of said access networks and wherein said mobility servers do not maintain duplicate copies of said subscriber data stored in said profile server; and
    utilizing the subscriber data at the profile server for operations in said mobility server.

9. The method of claim 8 wherein the profile server is adapted to interface to a plurality of external networks.

10. The method of claim 9 further comprising the step of providing a standard protocol for the interface between the profile server and the external networks.

11. The method of claim 10 further comprising the step of providing an application interface to the profile server for subscriber modification of the subscriber data.

12. The method of claim 8 wherein each mobility server is adapted to Interface to a plurality of networks.

13. The method of claim 12 wherein each mobility server is adapted to administrate networks of a single access technology.

14. A mobile telecommunications system including a plurality of access networks and a core network, providing roaming functionality without replication of subscriber records, comprising:
    a mobility server in said core network communicatively interfaced with one or more external networks and storing location information associated with one or more subscriber units;
    a profile server in said core network for storing the subscriber records associated with said one or more subscriber units and, communicatively interfaced with one or more external networks, and communicatively linked with the mobility server, wherein said profile server does not store duplicative data stored in said mobility server;
    a plurality of access service infrastructures within said access networks communicatively interfaced with the mobility server, each providing telecommunication access within a particular area; and
    said one or more subscriber units communicatively interfaced with the profile server, operating within one of the particular areas.

* * * * *